I#

(12) United States Patent
Gold et al.

(10) Patent No.: US 9,277,090 B2
(45) Date of Patent: Mar. 1, 2016

(54) SYSTEM AND METHOD OF DOCUMENT REPRODUCTION

(75) Inventors: Curtis Gold, Boise, ID (US); Michael J. Shelton, Boise, ID (US); Jerry Shelton, Boise, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2647 days.

(21) Appl. No.: 11/906,488

(22) Filed: Oct. 1, 2007

(65) Prior Publication Data

US 2009/0086258 A1    Apr. 2, 2009

(51) Int. Cl.
| | | |
|---|---|---|
| G06K 1/00 | (2006.01) | |
| H04N 1/32 | (2006.01) | |
| G06K 9/00 | (2006.01) | |
| H04N 1/00 | (2006.01) | |

(52) U.S. Cl.
CPC ........ *H04N 1/32144* (2013.01); *G06K 9/00456* (2013.01); *H04N 1/00374* (2013.01); *H04N 2201/3245* (2013.01); *H04N 2201/3271* (2013.01)

(58) Field of Classification Search
CPC .......... H04N 1/32144; H04N 1/00374; H04N 2201/3245; H04N 2201/3271; G06K 9/00456
USPC ........................................ 358/1.1, 1.15, 1.14
See application file for complete search history.

(56) References Cited

U.S. PATENT DOCUMENTS

| | | | |
|---|---|---|---|
| 4,468,809 | A | 8/1984 | Grabowski et al. |
| 5,052,042 | A | 9/1991 | Morton et al. |
| 5,883,986 | A | 3/1999 | Kopec et al. |
| 5,933,525 | A | 8/1999 | Makhoul et al. |
| 6,269,171 | B1 | 7/2001 | Gozzo et al. |
| 6,298,158 | B1 | 10/2001 | Egozi et al. |
| 7,092,870 | B1 | 8/2006 | Chen et al. |
| 2005/0151998 | A1* | 7/2005 | Pettigrew et al. ............ 358/1.18 |
| 2005/0248808 | A1* | 11/2005 | Ma et al. ...................... 358/1.15 |
| 2006/0026078 | A1 | 2/2006 | King et al. |
| 2007/0110339 | A1 | 5/2007 | DeYoung et al. |
| 2009/0108072 | A1* | 4/2009 | Wang ....................... 235/462.41 |

FOREIGN PATENT DOCUMENTS

| | | | |
|---|---|---|---|
| EP | 0602955 | B1 | 12/2000 |
| EP | 1598770 | A2 | 11/2005 |

* cited by examiner

*Primary Examiner* — Iriana Cruz
(74) *Attorney, Agent, or Firm* — Fabian Van Cott

(57) ABSTRACT

A document reproduction system includes an optical scanning device configured to output an electronic representation of a document comprising both machine printed and non-machine printed elements; and a computing device in communication with the optical scanning device. The computing device is configured to distinguish between the machine printed and non-machine printed elements in the electronic representation of the document. The computing device is configured to selectively print or store only the machine or non-machine printed elements based on user input. A method of document reproduction includes scanning a document having both printed and non-printed content to produce an electronic image; and automatically distinguishing between the printed and non-printed elements in the electronic image of the document.

11 Claims, 8 Drawing Sheets

SYSTEM AND METHOD OF DOCUMENT REPRODUCTION

BACKGROUND

Paper documents have maintained their appeal to many people despite the increased availability of electronic forms of data storage. Today, many paper documents bearing data of all different types can be printed and prepared in hardcopy form with an electronic inkjet or laser printer. Paper documents are especially useful when a user desires to annotate the printed material on the document with handwritten notes and sketches.

Many current technologies exist for the manipulation of printed documents. One of these technologies is the ability to scan a hardcopy document and then reproduce a copy of the document or a digital file representative of the markings on the hardcopy document. The scanner can capture any markings on a hardcopy document including both printed and handwritten elements, without adversely affecting the original document.

Another present technology that is used with printed documents is optical character recognition (OCR). Optical character recognition involves the recognition of machine-editable text in images of printed documents (usually captured by a scanner). Computer algorithms are typically used on a scanned image of a printed document to discern printed text. In many cases, printed non-text characters such as lines, columns, and printed images may also be discerned from the scanned image. OCR technology is currently used mostly to provide a user of a word processing program with editable text extracted from the printed document. However, OCR technology may be exploited for many different applications.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
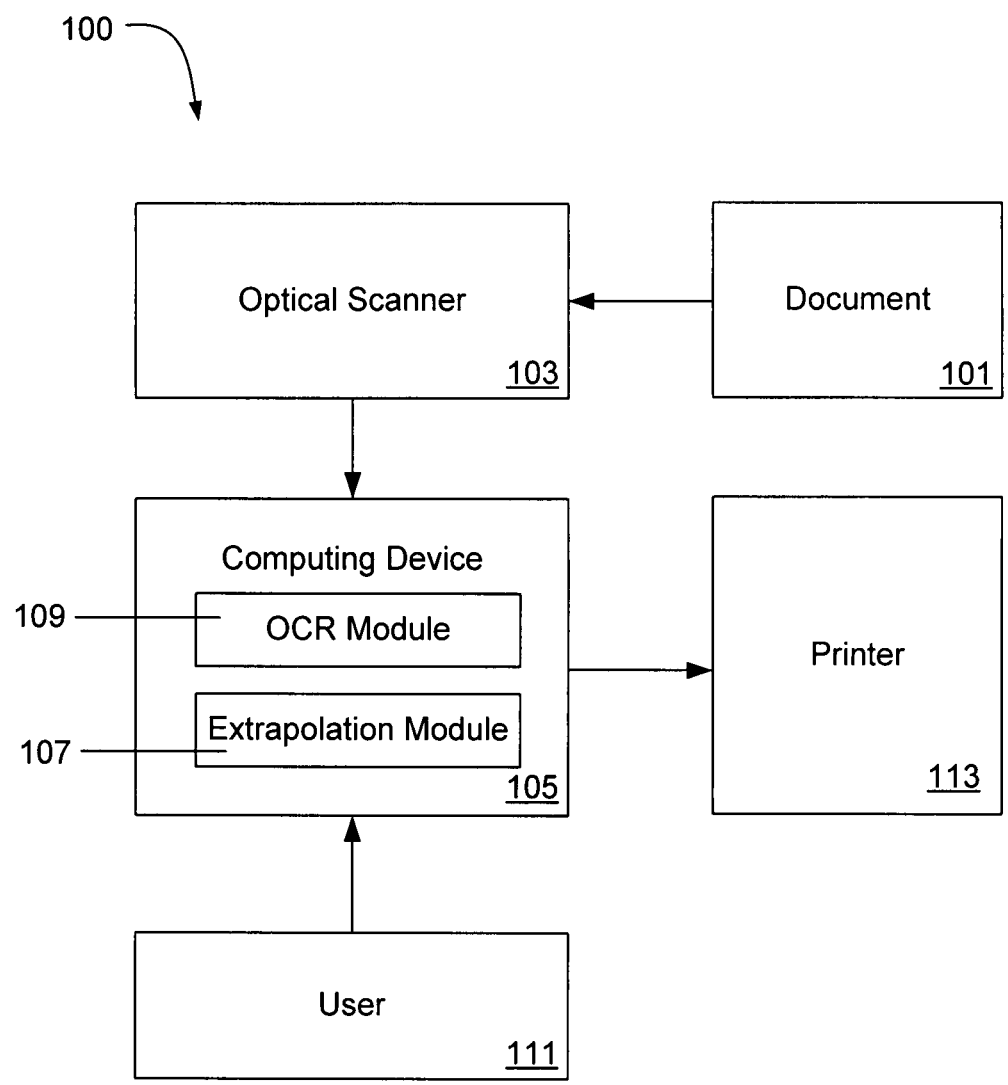
FIG. 1 is a block diagram illustrating an illustrative embodiment of a system of document reproduction, according to principles described herein.

As mentioned above, scanners are often used with paper or hardcopy documents. The scanner may be used to produce a reproduction of the hardcopy document as a stored digital file accessible to a computing device, as a physical reproduction on print media, or both.

In many cases an original printed document to be scanned may include both printed and non-printed, e.g., handwritten, material. As noted above, hardcopy documents are often edited and/or updated with handwritten notations. However, in many situations, these same documents need to be shared with others in their original forms, that is, without the handwritten notations. In some cases, the original file is not available or conveniently accessible to reprint or share with a recipient, thus causing difficulty in sharing, e-mailing, copying, or scanning an original "clean" copy of the original document for further distribution.

One prior solution to this dilemma includes simply copying or scanning a marked-up document in its entirety. In this solution, the additional markings are reproduced in any reproduction of the document. The additional markings may be distracting to a reader of the reproduction or confidential to the person who created them. Thus, it may be less desirable in many cases to use this solution.

Another prior solution includes using "white-out" or some other type of masking element to physically cover up or make illegible any markings on the original document. While this solution may provide a reproduction of the original document without the unwanted annotations, it may pose problems when the annotations are integrated within or over the original text. Moreover, the marked up document may have important annotations added that should not be removed simply to make a copy of the original document.

To resolve the above issues, and others posed by the prior art, the present specification discloses systems and methods of document reproduction, in which users have an option to filter the information on a document that they desire to copy or scan. In documents having a combination of printed markings and non-printed markings, e.g., handwritten annotations, the user may designate that only one of either the printed markings or non-printed markings be reproduced.

As used in the present specification and in the appended claims, the term "machine printed," "print" or "printed" refers to characters or other markings that are imparted to media by an electronic printer, plotter, printing press or similar device. The terms also refer to the process by which characters or other markings are imparted to the media. Similarly, "non-machine printed" or "non-printed" characters or markings refer to any characters or markings that have been made on a document by other methods, for example, handwritten annotations.

As used in the present specification and in the appended claims, the term "derivative document" refers to a document that contains some, but not all, of the content of an original or parent document. For example, a derivative document may include only the machine printed content of an original document or only the non-machine printed content of an original document.

The document reproduction systems of the present specification incorporate an optical scanning device with a computing device configured to distinguish between printed and non-printed markings on the document. The system can then reproduce only those elements desired by a user, e.g., only the printed elements, only the non-printed markings or some combination of the two.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods of document reproduction.

Illustrative Systems

Referring now to FIG. 1, a block diagram illustrating an illustrative embodiment of a system (100) of document reproduction is shown. The system (100) includes an optical scanner (103). The optical scanner is configured to obtain an electronic representation of a document (101) to be reproduced. The optical scanner (103) may, in some embodiments, be a flatbed scanner or a drum scanner. The optical scanner (103) may use an array of charge coupled devices (CCDs), photomultipler tubes (PMTs), or other electronic devices to obtain the electronic representation of the visual appearance of the hardcopy document (101). Additionally, the optical scanner (103) may be a component in a photocopier or a multi-use peripheral device.

The optical scanner (103) is in communication with a computing device (105). The computing device (105) is configured to receive the electronic representation of the document (101) from the optical scanner (103). The computing device (105) may be one of many possible devices having processing capabilities. Examples of such devices include, but are not limited to, personal computers, embedded systems in peripheral devices, handheld devices, and the like. Once the computing device (105) has received the electronic representation of the document (101), an optical character recognition module (109) present in the computing device (105) distinguishes between the machine printed marking and non-machine printed markings in the electronic representation of the document (101).

In the illustrated example, the document (101) has both printed and non-printed characters. For example, the document (101) may be a document printed on a laser printer that has handwritten notes and sketches written thereon with a pen or similar writing implement by one in possession of the document (101).

The computing device (105) includes an optical character recognition module (109) configured to distinguish between the machine printed characters and the non-printed characters in the document (101). By detecting the printed characters and distinguishing these characters from non-printed characters and images in the document (101), an image of the document (101) as it was originally printed (i.e., prior to the introduction of handwritten markings) may be produced by an extrapolation module (107).

The extrapolation module (107) is configured to use data obtained from the OCR module (109) to extrapolate an image desired by a user (111) for reproduction. For example, in some embodiments, the user (111) may desire to reproduce the document (101) as it was originally printed. In such a case, the preference of the user (111) will be received by the computing device (105) through a user interface and used in conjunction with the OCR module (109) and the extrapolation module (107) to extrapolate the desired image from the electronic representation of the appearance of the document (101) that was obtained from the optical scanner (103). A new image file representing a derivative document may be produced by the extrapolation module (107) in the computing device (105).

Many of the functional units described in this specification have been labeled as modules in order to more particularly emphasize their implementation independence. For example, modules may be implemented in software for execution by various types of processors. An identified module of executable code may, for instance, have one or more physical or logical blocks of computer instructions that may, for instance, be organized as an object, procedure, or function. Nevertheless, the executables of an identified module need not be physically located together, but may have disparate instructions stored in different locations which, when joined logically together, compose the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices, or the like.

The computing device (105) is also in communication with a printer (113). The printer (113) is configured to produce a physical copy of the image extrapolated from the electronic representation of the document (101) obtained by the optical scanner (103).

In some embodiments, the system (100) shown may be incorporated into a photocopier. In one particular embodiment, the photocopier may contain a drum-type optical scanner (103), where the document (101) is loaded onto a drum and scanned using photomultiplier tubes. The computing device (105) is an integral part of the photocopier. The scanned image data may then be analyzed by the OCR module (109) and the extrapolation module (107). The OCR module (109) identifies recognized characters from printed fonts and uniform pixels that indicate recognized printed formatting markings.

The user (111) of the present example is prompted by the photocopier to indicate which of the markings on the document are desired for reproduction. Upon receiving an indication that the user (111) only desires that the printed material in the document (101) be reproduced, the extrapolation module (107) extrapolates the printed characters and markings from the original scanned image obtained by the optical scanner (103) and creates a new image file representing a derivative document including only the printed characters and markings. This new image file is then sent to the printer (113) in the photocopier, which may use the same drum as the optical scanner, where the extrapolated printed characters and markings are reproduced on a new sheet of print media.

Figure 2:
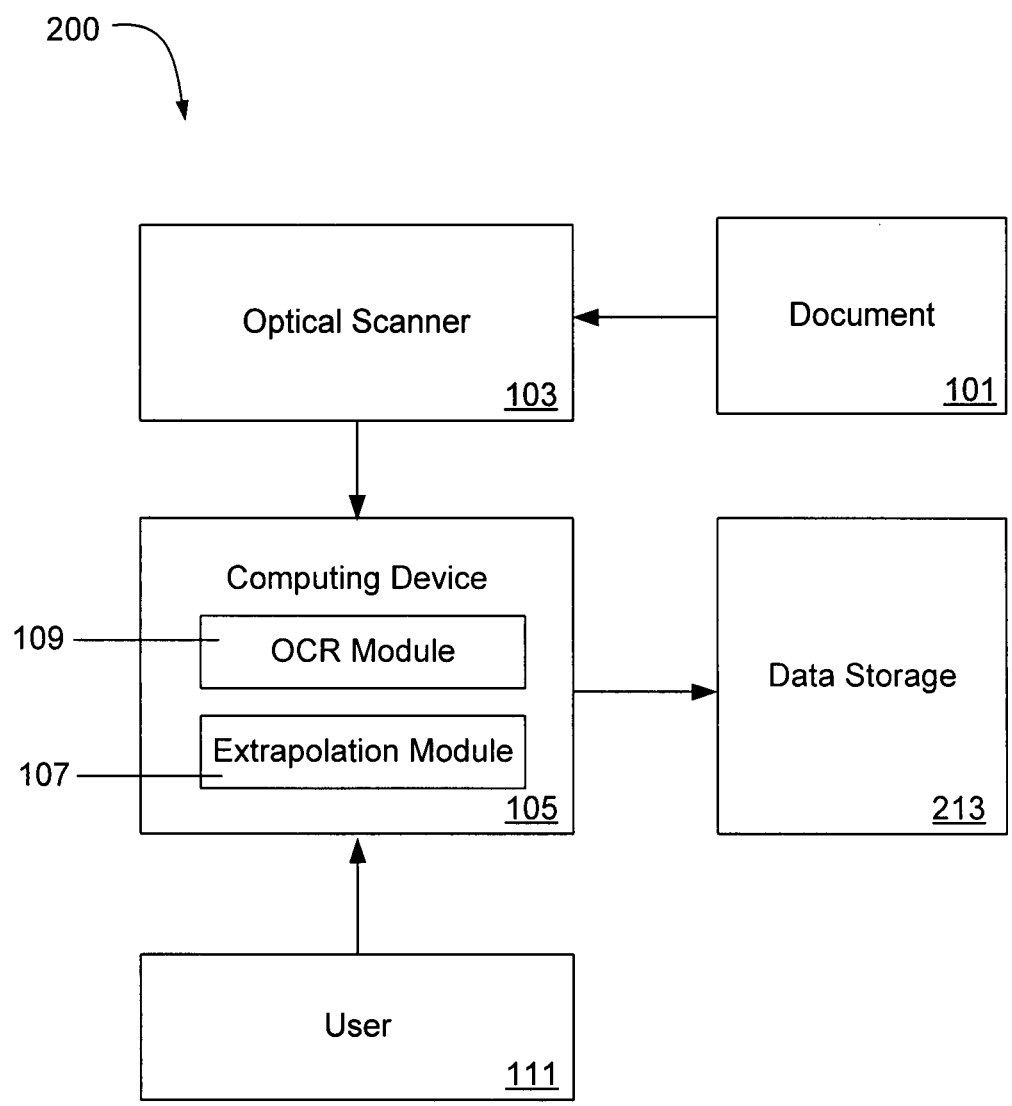
FIG. 2 is a block diagram illustrating an illustrative embodiment of a system of document reproduction, according to principles described herein.

Referring now to FIG. 2, another block diagram of an illustrative embodiment of a document reproduction system (200) is shown. The document reproduction system (200) includes an optical scanner (103) in communication with a computing device (105), as discussed in relation to FIG. 1. The computing device includes an OCR module (109) and an extrapolation module (107). As explained previously, these modules (109, 107) may be present in software running on the computing device (105), as hardware components in the computing device (105), or as combinations thereof.

The computing device (105) is in communication with a data storage medium (213). The data storage medium (213) may be an electronic storage medium such as a disk drive, Flash memory drive or other storage medium associated with the computing device (105). In the present example, digital image representations extrapolated from the original image obtained by the optical scanner (103) may be transferred to the data storage medium (213) instead of being immediately printed, as in the example described in connection with FIG. 1. The image files stored in the data storage medium (213) may then be accessed by a user (111) when desired.

Similar to the system (100, FIG. 1) shown previously, the computing device (105) includes an optical character recognition module (109) configured to distinguish between the machine printed characters and the non-printed elements in the document (101). By detecting the printed characters and distinguishing these characters from non-printed characters and elements in the document (101), an image of the document (101) as it was originally printed (e.g., prior to the introduction of handwritten markings) may be produced by an extrapolation module (107).

The extrapolation module (107) is configured to use data obtained from the OCR module (109) to extrapolate an image desired by a user (111) for reproduction. For example, in some embodiments the user (111) may desire to reproduce the document (101) as it was originally printed. In such a case, the preference of the user (111) will be received by the computing device (105) and used in conjunction with the OCR module (109) and the extrapolation module (107) to extrapolate the desired image from the electronic representation of the appearance of the document (101) that was obtained from the optical scanner (103). A new image file representing a derivative document may be produced by the extrapolation module (107) in the computing device (105) and stored in the data storage medium (213).

Those familiar with the art will understand that while the illustrative system (100, FIG. 1) shown in FIG. 1 has a printer (113, FIG. 1) and the illustrative system of FIG. 2 (200, FIG. 2) has a data storage medium (213, FIG. 2), many embodiments of document reproduction systems according to the principles of the present specification may include both printers (113, FIG. 1) and data storage media (213, FIG. 2). In these embodiments, a user (111, FIG. 1) may elect to store the document reproduction in the data storage medium (213, FIG. 2), produce a physical reproduction using the printer (113, FIG. 1), or both.

With the user's selection of material to be reproduced in place, the OCR module (109, FIG. 1) and the extrapolation module (107, FIG. 1) in the document reproduction system (100, FIG. 1) cooperate as follows. The OCR module (109, FIG. 1) parses the scanned image of the document for pixel groupings that represent printed characters recognizable by the OCR module. In a typical implementation, an OCR module or process then produces a document in which the recognized characters are presented by editable electronic text that can be edited, for example, by a word processing application.

In the document reproduction systems described herein, the OCR module is used to identify electronically-printed text in the scanned image of the hardcopy document. If the OCR module is able to recognize characters in the scanned image of the hardcopy document, the OCR module identifies those characters to the extrapolation module (107, FIG. 1).

The extrapolation module (107, FIG. 1) may then make a distinction between printed elements and handwritten elements in the scanned image of the hardcopy document. Elements, e.g., characters, recognized by the OCR module (109, FIG. 1) are classified as printed elements. In some embodiments, the extrapolation module (107, FIG. 1) may consider all other elements in the scanned image of the hardcopy document to be non-printed, e.g., handwritten annotations. The extrapolation module (107, FIG. 1) then separates the elements classified as printed and non-printed elements and may print a reproduction document or store an electronic file that includes only those elements requested by a user, e.g., printed or non-printed.

There may be elements, such as lines, boxes, tables, photographs, images, graphs, etc. that are not recognizable as characters by an OCR module, but which were printed electronically and should be identified as printed, rather than non-printed, elements in the scanned image of the document. Consequently, in other embodiments, the extrapolation module (107, FIG. 1) may, after obtaining the identification of printed characters from the OCR module (109, FIG. 1), conduct further processing to identify such non-character printed elements in the scanned image of the hardcopy document. For example, the extrapolation module (107, FIG. 1) may identify areas with relatively dense pixel count and straight regular borders as a photograph or other image printed in the hardcopy document. Again, such an element may then be classified as printed and included in or omitted in a reproduction print or electronic file based on user input. The extrapolation module may also identify areas with sufficiently regular, straight lines as printed lines, tables, borders, etc., rather than non-printed, handwritten elements.

By "regular," reference is made to a consistent number of pixels that are included in, for example, a line along its length. Such a regular line is most likely to have been machine printed rather than handwritten. Thus, regularity, as so defined, can be used by the extrapolation module (107, FIG. 1) to classify an element as printed or non-printed.

Similarly, "straight" refers to a line of pixels that are either aligned as to row or column within the scanned image of the hardcopy document or that crosses rows or columns of pixels with a slope that mathematically identifies a straight line. As above, a "straight" line, as so defined, is most likely to have been machine printed rather than handwritten and can be classified by the extrapolation module (107, FIG. 1) as printed rather than non-printed.

These, and any similar characteristics, that help distinguish between printed and non-printed elements in the scanned image of a hardcopy document can be used by the extrapolation module (107, FIG. 1). As indicated, the extrapolation module (107, FIG. 1) then separates the elements classified as printed and non-printed elements and may print a reproduction document or store an electronic file that includes only those elements requested by a user, e.g., printed or non-printed.

Illustrative Documents

Figure 3:
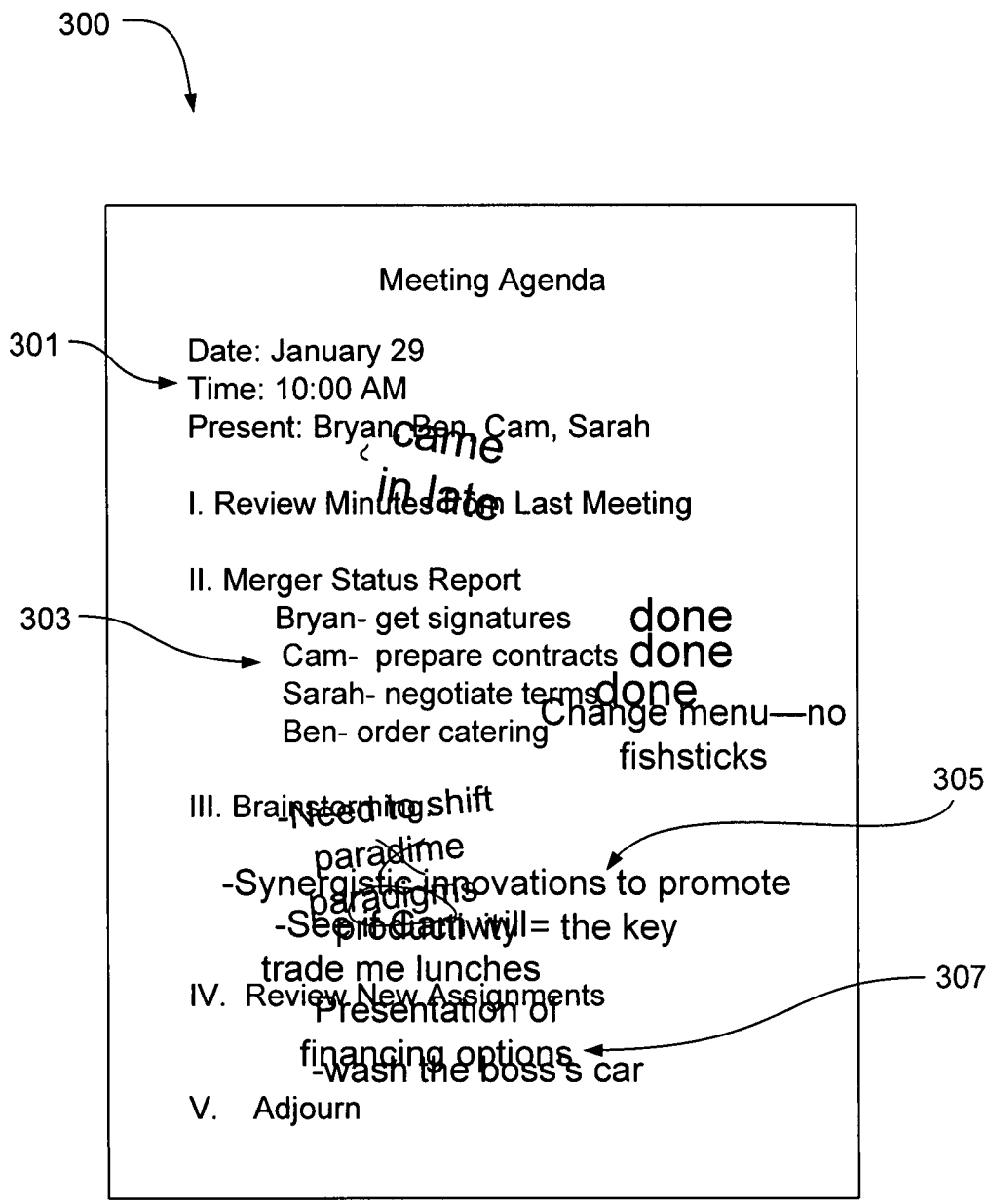
FIG. 3 is a diagram of an illustrative embodiment of a printed document, according to principles described herein.

Referring now to FIG. 3, an illustrative embodiment of a printed document (300) that may be used with systems of the present specification is shown. The printed document (300) shown is a meeting agenda, intended for distribution to participants in a meeting. Typically, agendas such as the document (300) shown are used by recipients to track the progress of a meeting and to record notes. The printed document (300) includes text characters (301, 303) printed by a machine, such as a laser printer. The document (300) also includes non-printed annotations (305, 307). These annotations (305, 307) are representative of the types of handwritten notes that a participant in a meeting may record on his or her copy of the agenda document (300).

Figure 4:
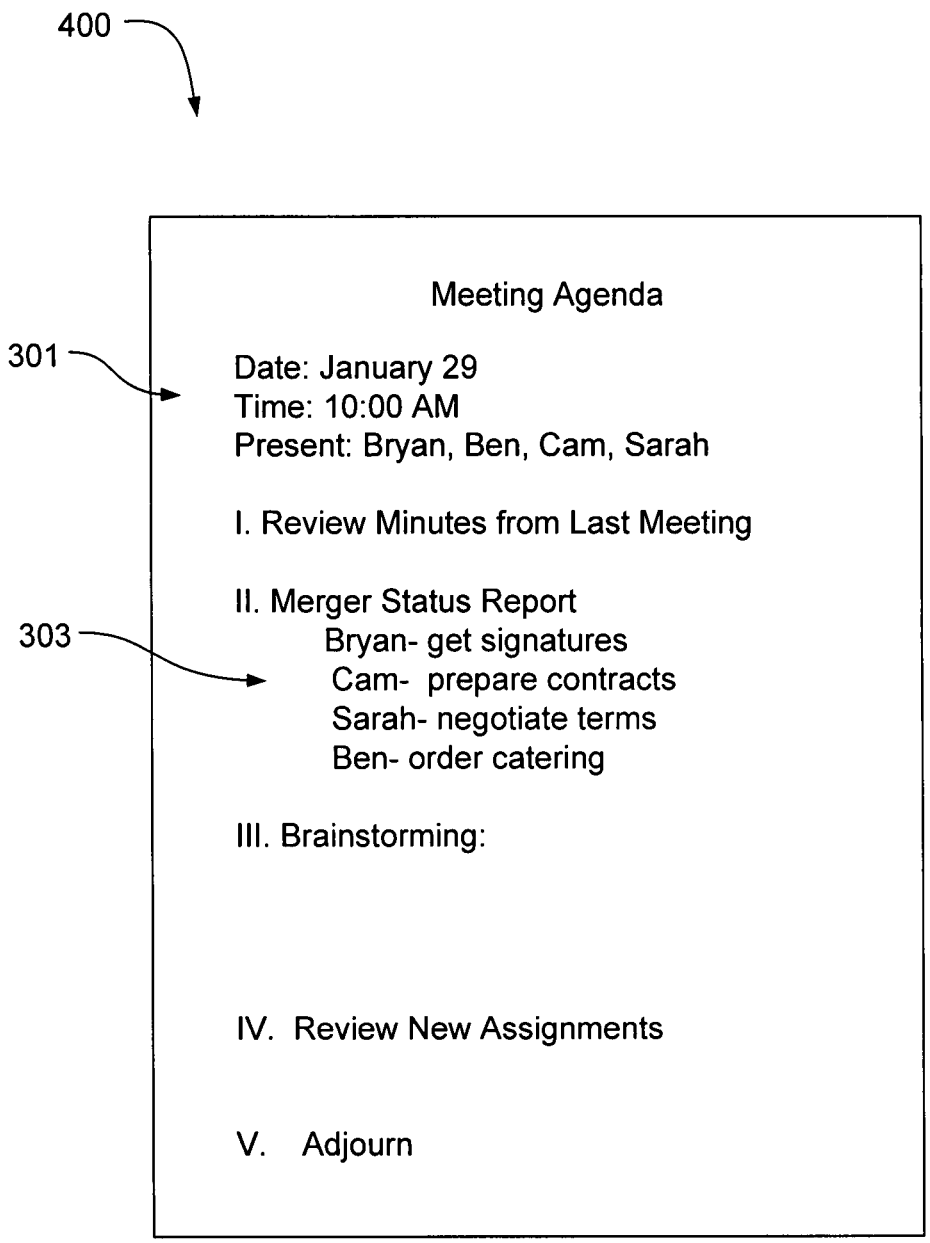
FIG. 4 is a diagram of an illustrative embodiment of a reproduction of a printed document, according to principles described herein.

Referring now to FIG. 4, an illustrative embodiment of a reproduction (400) of the printed document (300, FIG. 3), according to the principles described above, is shown. The non-printed annotations (305, 307; FIG. 3) are not present on the reproduction (400) because a user of a document reproduction system (100, FIG. 1) as described herein elected to remove the non-printed annotations (305, 307; FIG. 3) from the reproduction (400).

In an office meeting, each participant may have a hardcopy of a document, such as the printed agenda (300) shown in FIG. 3. As indicated, each participant may take handwritten notes on the printed document (e.g., 305, 307, FIG. 3). We now assume that an additional participant enters the office meeting late and requests a copy of the printed document. In the event that no additional, clean copies of the printed document are available, an annotated copy (e.g., 300, FIG. 3) can be quickly scanned using the systems described herein. A reproduction (400, FIG. 4) is then produced that consists only of the printed or original elements of the document and that excludes the handwritten annotations on the copy scanned (300, FIG. 3). In this way, the late arrival receives a clean copy of the original agenda without any handwritten annotations.

Figure 5:
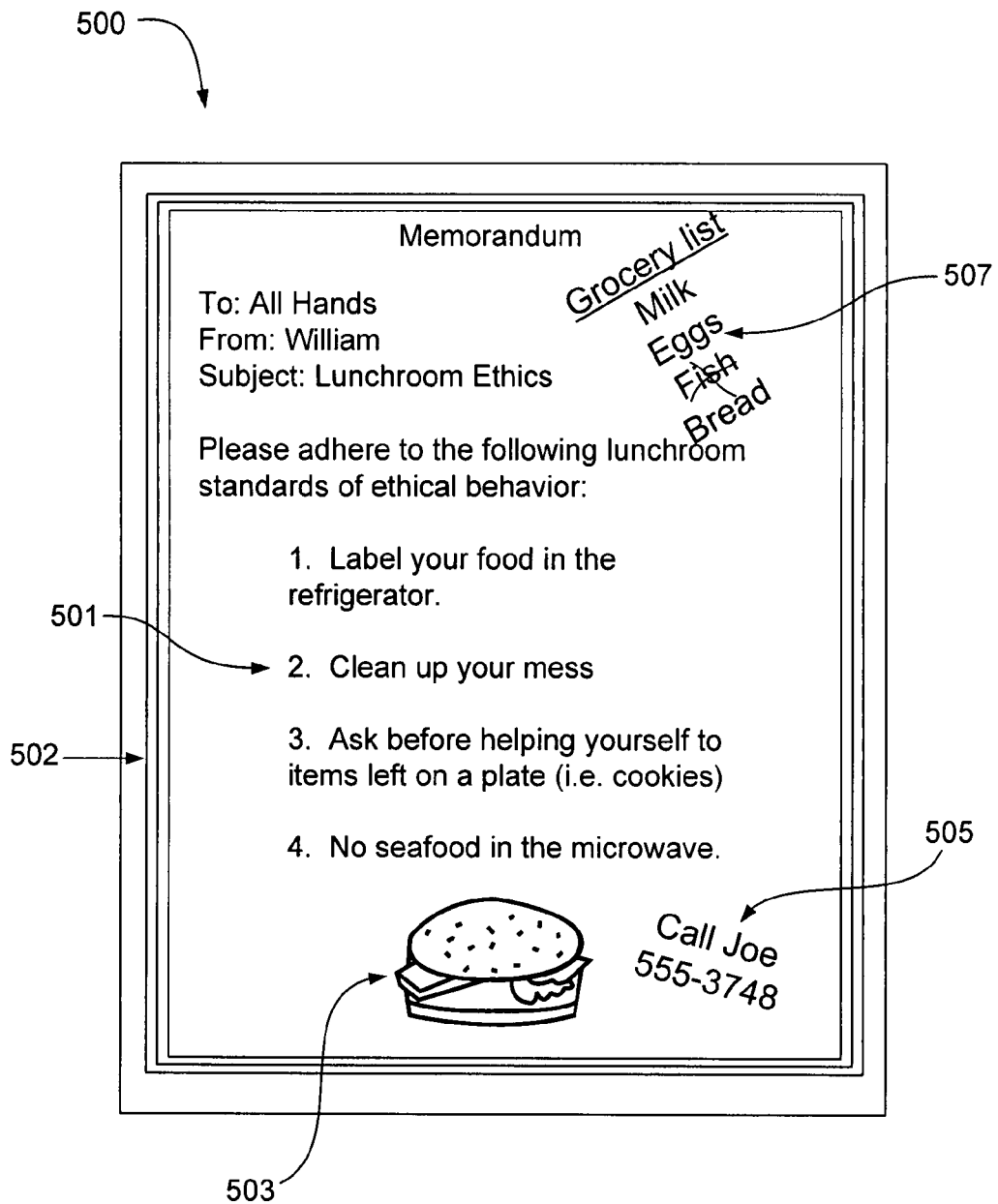
FIG. 5 is a diagram of an illustrative embodiment of a printed document, according to principles described herein.

Referring now to FIG. 5, another illustrative document (500) is shown. Similar to the document (300, FIG. 3) described above, the illustrative document (500) includes both printed and non-printed markings. The printed markings on the document (500) include printed text (501), a printed image (503), and a printed border (502). The non-printed markings on the document (500) include handwritten annotations (505, 507).

Systems for document reproduction according to the described herein may be used to scan and reproduce the document (500) to be stored in a data storage medium (213, FIG. 2) or on a sheet of print media using a printer (113, FIG. 1). In some embodiments, a document reproduction system may distinguish not only between printed (501, 502, 503) and non-printed markings on the document (500), but also between printed text (501) and printed images, such as the printed border (502) and the printed image (503). The computing device (105, FIG. 1) may operate using an algorithm that examines pixels of the scanned image for continuity and uniformity as described above. In this way, or by using other algorithms, it may be possible for a user to elect which of the printed text (501), printed images (502, 503), and/or the handwritten annotations (505, 507) that he or she wishes to reproduce.

Figure 6:
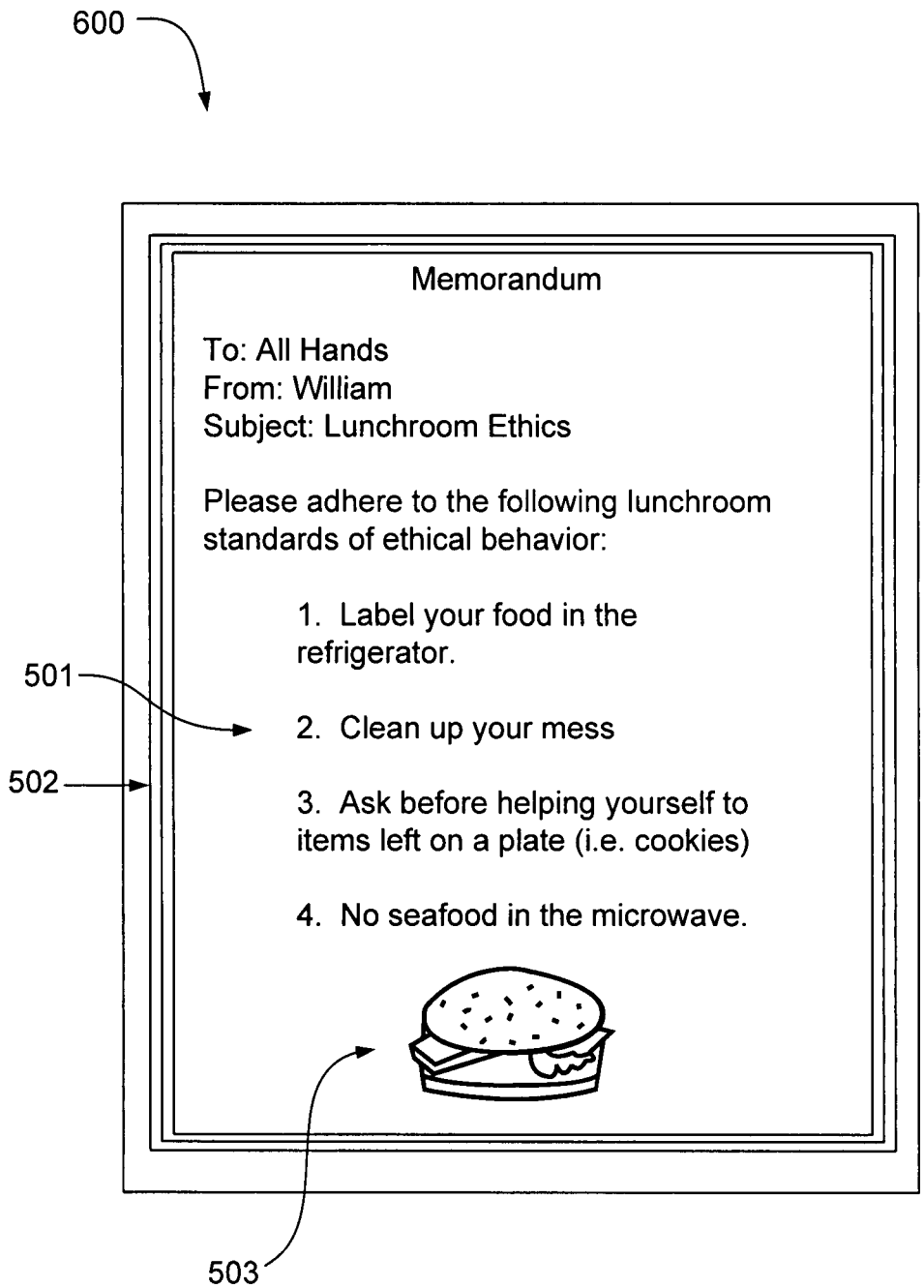
FIG. 6 is a diagram of an illustrative embodiment of a reproduction of a printed document, according to principles described herein.

Referring now to FIG. 6, an illustrative reproduction (600) of the document (500, FIG. 5) is shown. The illustrative reproduction (600) includes the printed text (501), the printed border (502), and the printed image (503) while the handwritten annotations (505, 507) have not been reproduced.

Figure 7:
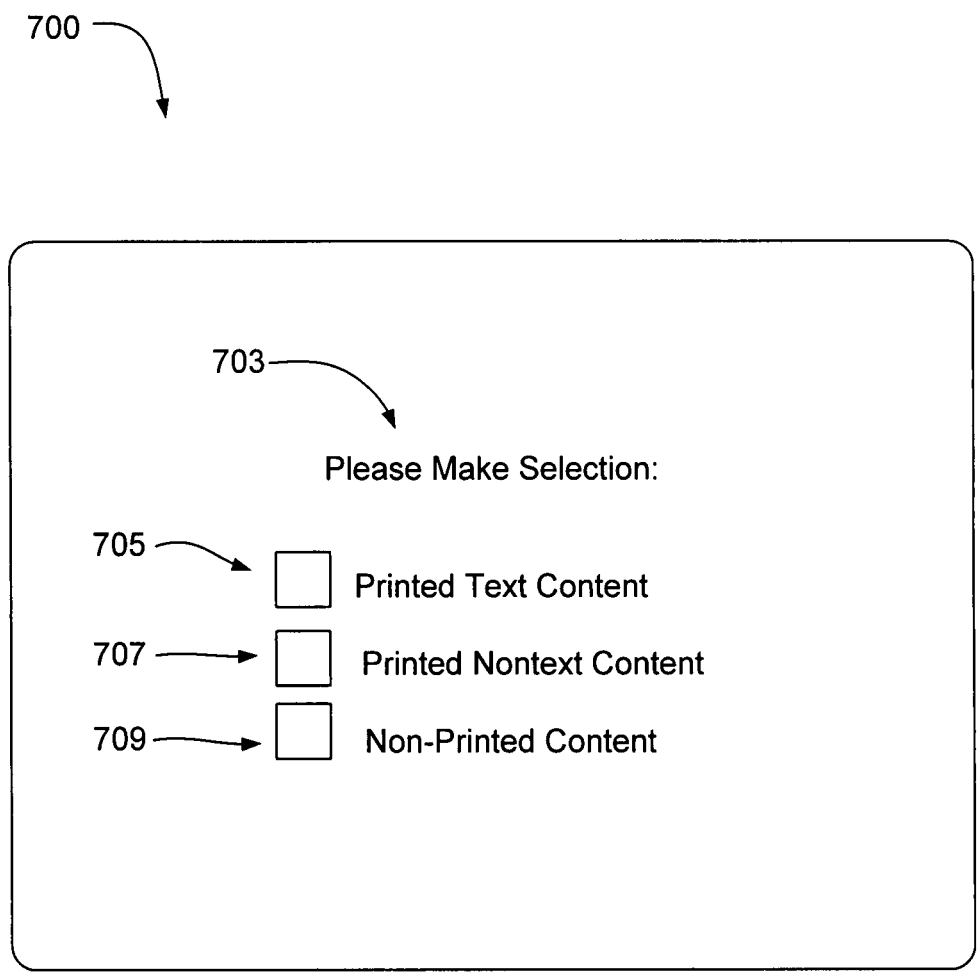
FIG. 7 is a diagram of an illustrative embodiment of an electronic display prompting a user to make a selection, according to principles described herein.

Referring now to FIG. 7, an illustrative embodiment of an electronic display or user interface (700) is shown for prompting a user to make a selection for a document reproduction. The electronic display is a component of a document reproduction system (100, FIG. 1), such as those described in relation to previous figures. The document reproduction system (100, FIG. 1) is configured to identify and extrapolate printed text content, printed non-text content, and non-printed content from the scanned image of a document. Upon scanning a document, a user may be presented with the prompt (703) shown on the electronic display, or a similar prompt. The prompt (703) allows the user to select which of the printed text content (705), the printed non-text content (707), and the non-printed content (709) to include in the reproduction of the document. As indicated, the user can select any combination of the various classifications of content for inclusion in a printed reproduction or electronic image file.

Illustrative Method

Figure 8:
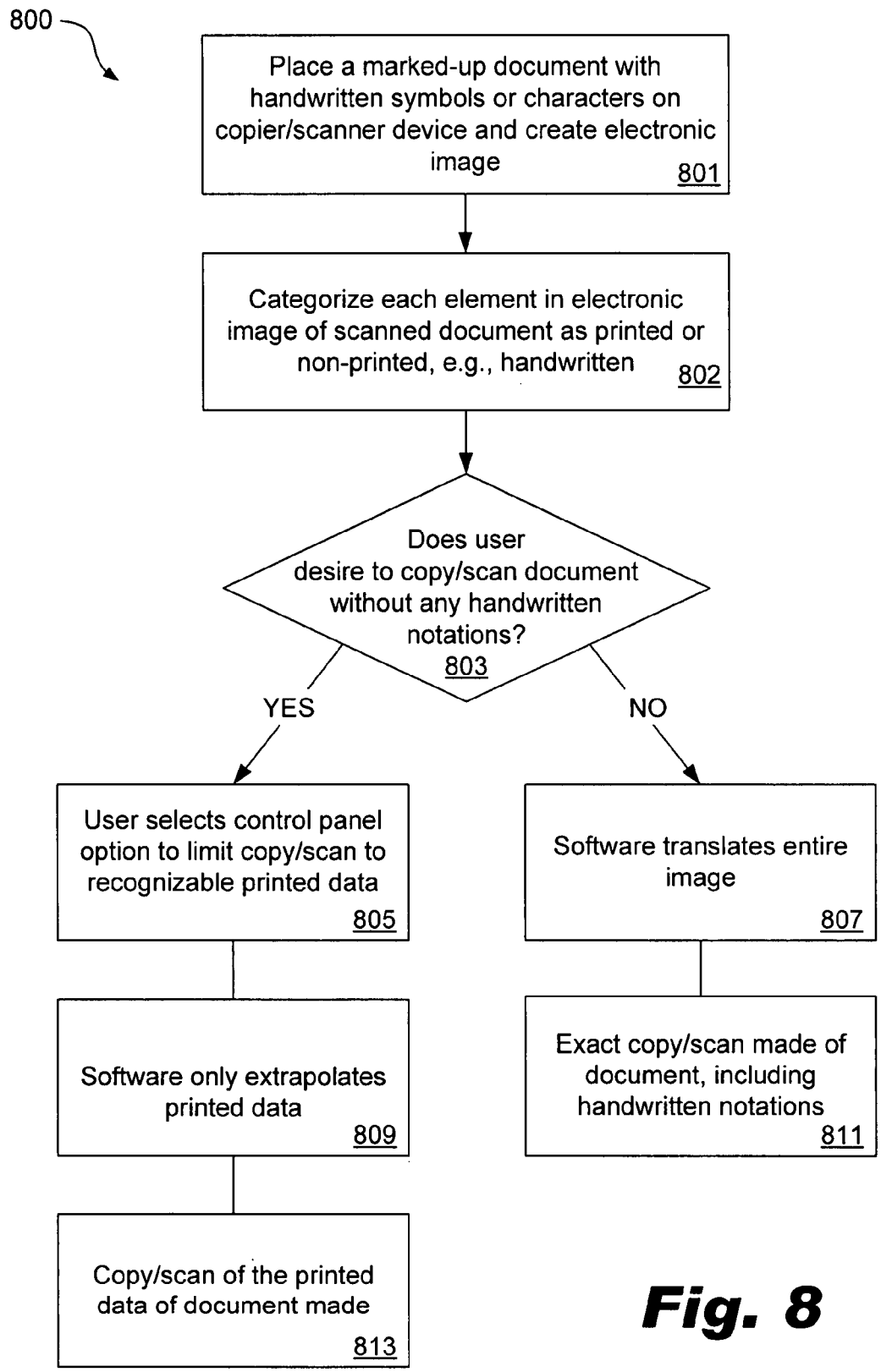
FIG. 8 is a flowchart illustrating an illustrative embodiment of a method of document reproduction, according to principles described herein.

Referring now to FIG. 8, a flowchart illustrating an illustrative method of document reproduction (800) is shown. The method (800) includes placing (step 801) a marked-up document on a photocopier or scanner device. As used herein the term "marked-up" document refers to a document that includes both printed and non-printed elements, i.e., electronically printed and handwritten elements. The copier or scanner is then operated to produce an electronic image of the hardcopy document.

Next, each element in the electronic image is distinguished and categorized (step 802) as printed (e.g., electronically printed with a printing device) or non-printed (e.g., handwritten). This step is performed using the criteria and algorithms described above.

A user may then decide (decision 803) whether to reproduce or store the electronic document without handwritten notations. In the event that the user does not desire to eliminate the handwritten notations from the reproduction of the document, software in the photocopier or scanner translates (step 807) an entire scanned image of the document into digital form. The translated image is then used to make (step 811) an exact copy or scan of the document, including the handwritten notations, that is accessible to the user.

If the user decides (decision 803) to copy or scan the document without any handwritten notations, the user selects (step 805) a control panel option on the photocopier or scanner to limit the copy or scan to recognizable printed data. OCR software in the photocopier/scanner or an associated computing device then extrapolates (step 809) printed content from a scanned image of the document as described herein, and a copy or scan of only the printed content is made (step 813).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A document reproduction system, comprising:
   an optical scanning device that outputs an electronic representation of a document comprising machine printed text, machine printed images, and non-machine printed elements; and
   a computing device in communication with said optical scanning device;
   in which said computing device:
      distinguishes between the machine printed text, machine printed images, and non-machine printed elements in said electronic representation of said document; and
      selectively stores a number of the machine printed text, machine printed images, and non-machine printed elements based on user input.

2. The document reproduction system of claim 1, wherein said computing device comprises an optical character recognition module and distinguishes between said machine printed text and non-machine printed elements based on output from said optical character recognition module.

3. The document reproduction system of claim 1, further comprising an interactive electronic display that obtains said input from a user.

4. The document reproduction system of claim 3, in which said input provides data required to determine which of said number of machine printed text, machine printed images, and non-machine printed elements are selected.

5. The document reproduction system of claim 1, further comprising a printer in communication with said computing device that prints a new document comprising a number of the machine printed text, machine printed images, and non-machine printed elements based on said user input.

6. The document reproduction system of claim 1, further comprising a data storage medium in communication with said computing device that stores an electronic representation of a new document comprising said number of machine printed text, machine printed images, and non-machine printed elements based on said user input.

7. The document reproduction system of claim 1, wherein said computing device displays a user interface that allows a user to select which of the number of machine printed text, machine printed images, and non-machine printed elements to include in a reproduction of the electronic representation of the document.

8. A method of document reproduction, said method comprising:
   scanning a document comprising machine printed text, machine printed images, and non-machine printed elements to produce an electronic image;
   distinguishing between the machine printed text, machine printed images, and non-machine printed elements in said electronic image of said document;
   receiving user input selecting a number of the machine printed text, machine printed images, and non-machine printed elements; and
   printing a hardcopy of a derivative document containing the number of the machine printed text, machine printed images, and non-machine printed elements of the scanned document as dictated by said user input.

9. The method of claim 8, further comprising storing in memory an electronic image of said derivative document.

10. The method of claim 8, further comprising performing said distinguishing between said printed text, machine printed images, and non-printed elements using optical character recognition.

11. The method of claim 8, further comprising performing said distinguishing between said printed text, machine printed images, and non-printed elements based on regularity or straightness of content in said electronic image of said document.

* * * * *